(12) United States Patent
Hiramatsu et al.

(10) Patent No.: US 7,186,386 B1
(45) Date of Patent: Mar. 6, 2007

(54) SYSTEM FOR EXHAUST GAS PURIFICATION

(75) Inventors: Takuya Hiramatsu, Nagoya (JP); Akira Takahashi, Nagoya (JP); Naomi Noda, Ichinomiya (JP); Junichi Suzuki, Kuwana (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/524,575

(22) Filed: Mar. 13, 2000

Related U.S. Application Data

(63) Continuation of application No. 08/726,468, filed on Oct. 4, 1996, now abandoned.

(30) Foreign Application Priority Data

Oct. 4, 1995 (JP) .................................. 7-257630

(51) Int. Cl.
    *B01D 50/00* (2006.01)
(52) U.S. Cl. ........................... 422/171; 422/168
(58) Field of Classification Search ........ 422/170–171, 422/177, 173, 180, 211, 222; 60/299, 300, 60/297
See application file for complete search history.

(56) References Cited

U.S. PATENT DOCUMENTS

| 5,164,169 | A | 11/1992 | Rubin | 423/709 |
| 5,164,170 | A | 11/1992 | Rubin | 423/709 |
| 5,164,350 | A | 11/1992 | Abe et al. | 502/66 |
| 5,232,579 | A | 8/1993 | Absil et al. | 208/113 |
| 5,296,198 | A | 3/1994 | Abe et al. | 422/180 |
| 5,407,880 | A | 4/1995 | Ikeda et al. | 502/67 |
| 5,447,694 | A | 9/1995 | Swaroop et al. | 422/171 |
| 5,538,698 | A | 7/1996 | Abe et al. | 422/174 |
| 6,869,573 | B2 | 3/2005 | Abe et al. | 422/180 |
| 2003/0099583 | A1 | 5/2003 | Ikeda et al. | 422/180 |

FOREIGN PATENT DOCUMENTS

EP    0 592 713 A1    4/1994

(Continued)

OTHER PUBLICATIONS

Derwent Publications Ltd., London, GB; Class E19, AN 95-211814, XP002022684 & JP 07 124 468 (Nissan Motor Co Ltd.), May 16, 1995.

*Primary Examiner*—Glenn Caldarola
*Assistant Examiner*—Tom P. Duong
(74) *Attorney, Agent, or Firm*—Kubovick & Kubovick

(57) ABSTRACT

A system for exhaust gas purification includes at least one adsorbent capable of adsorbing harmful substances such as hydrocarbons and the like in exhaust gas and at least one catalyst containing a catalyst component, capable of reducing said harmful substances, both provided at an in-line position of exhaust pipe of internal combustion engine. In the system, the hydrocarbons, etc. in the exhaust gas emitted during cold engine start up of internal combustion engine are adsorbed by the adsorbent and the adsorbed hydrocarbons, etc. are desorbed from the adsorbent with the temperature rise of the adsorbent caused by the heat of the exhaust gas and are burnt on the catalyst. The adsorbent contains a H type β-zeolite having a $SiO_2/Al_2O_3$ ratio of 100 or more and can maintain good adsorption capability even when exposed to an exhaust gas of 750° C. or more form an internal combustion engine. This system for exhaust gas purification can effectively purify harmful substances in exhaust gas, particularly the hydrocarbons, etc. emitted in large amounts during cold engine start up.

11 Claims, 2 Drawing Sheets

FOREIGN PATENT DOCUMENTS

| | | |
|---|---|---|
| EP | 0593 898 A1 | 4/1994 |
| EP | 0 602 963 A1 | 6/1994 |
| EP | 0 661 098 A2 | 7/1995 |
| JP | 2-75327 | 3/1990 |
| JP | 4-176337 A | 6/1992 |
| JP | 4-293519 | 10/1992 |
| JP | 5-31359 | 2/1993 |
| JP | 5-201722 A | 8/1993 |
| JP | 6-142457 A | 5/1994 |
| JP | 7-174017 A | 7/1995 |
| JP | 7-213910 A | 8/1995 |
| JP | 7-241471 A | 9/1995 |
| WO | WO 94/11623 | 5/1994 |

SYSTEM FOR EXHAUST GAS PURIFICATION

This application is a continuation of application Ser. No. 08/726,468, filed Oct. 4, 1996, now abandoned.

BACKGROUND OF THE INVENTION (1) Field of the Invention

The present invention relates to a system for exhaust gas purification. More particularly, the present invention relates to a system for exhaust gas purification, which can effectively purify harmful substances in exhaust gas, particularly the hydrocarbons, etc. generated in large amounts during cold engine start up.

(2) Description of the Prior Art

In the FTP test (LA-4 mode) conducted in connection with the intensified U.S. regulation for automobile exhaust gas emission, 70 to 80% of the total amount of hydrocarbons (HC) emitted during the test is allowed to be emitted within 140 seconds (within the first hill of Bag 1) after engine cranking. During this period, however, when conventional three-way catalysts are used, most of the hydrocarbons are discharged without being purified because the catalysts need a considerably long time until they reach their activation temperatures.

In order to solve this problem, there were proposed various systems for exhaust gas purification, which comprises a catalyst and an adsorbent composed mainly of zeolite, both provided in the exhaust pipe of automobile and wherein the function of the adsorbent is to adsorb hydrocarbons until the catalyst reaches its activation temperature. For example, Japanese Patent Application Kokai (Laid-Open) No. 75327/1990 proposed a system for purification of automobile exhaust gas, using a Y-zeolite or mordenite as a hydrocarbons adsorbent; Japanese Patent Application Kokai (Laid-Open) No. 293519/1992 proposed a system using an adsorbent obtained by subjecting a ZSM-5 to ion exchange with Cu and Pd; and Japanese Patent Application Kokai (Laid-Open) No. 31359/1993 proposed an adsorbent containing a high-silica zeolite having a Si/Al ratio of 40 or more and, as necessary, a heat-resistant oxide and a noble metal(s) such as Pt, Pd and/or Rh.

The zeolites used as an adsorbent in conventional systems for exhaust gas purification, however, have no sufficient heat resistance or adsorption capability and the effects are not satisfactory. Particularly with in-line type exhaust gas purification systems, since each component of system is exposed to an exhaust gas of high temperatures, there takes place, for example, the thermal destruction of zeolite crystal structure, which has tended to invite deterioration of adsorption capability.

OBJECT AND SUMMARY OF THE INVENTION

The present invention has been made in view of the above-mentioned situation. The object of the present invention is to provide a system for exhaust gas purification, which can effectively purify harmful substances in exhaust gas, particularly the hydrocarbons, etc. emitted in large amounts during engine cold start.

According to the present invention, there is provided a system for exhaust gas purification, comprising at least one adsorbent capable of adsorbing harmful substances such as hydrocarbons and the like in exhaust gas and at least one catalyst containing a catalyst component, capable of reducing said harmful substances, both provided at an in-line position of exhaust pipe of internal combustion engine, in which system the hydrocarbons, etc. in the exhaust gas emitted during cold engine start up of internal combustion engine are adsorbed by the adsorbent and the adsorbed hydrocarbons, etc. are desorbed from the adsorbent with the temperature rise of the adsorbent caused by the heat of the exhaust gas and are burnt on the catalyst, wherein the adsorbent contains a H-type β-zeolite having a $SiO_2/Al_2O_3$ ratio of 100 or more and can maintain good adsorption capability and desorbability even when exposed to an exhaust gas of 750° C. or more from an internal combustion engine.

Incidentally, in the present invention, "in-line position (type)" means that components consistuting the system connect each other without using by-pass valving. In other words, an in-line exhaust system has no by-pass line in a series of exhaust system.

DETAILED DESCRIPTION OF THE INVENTION

Figure 1:
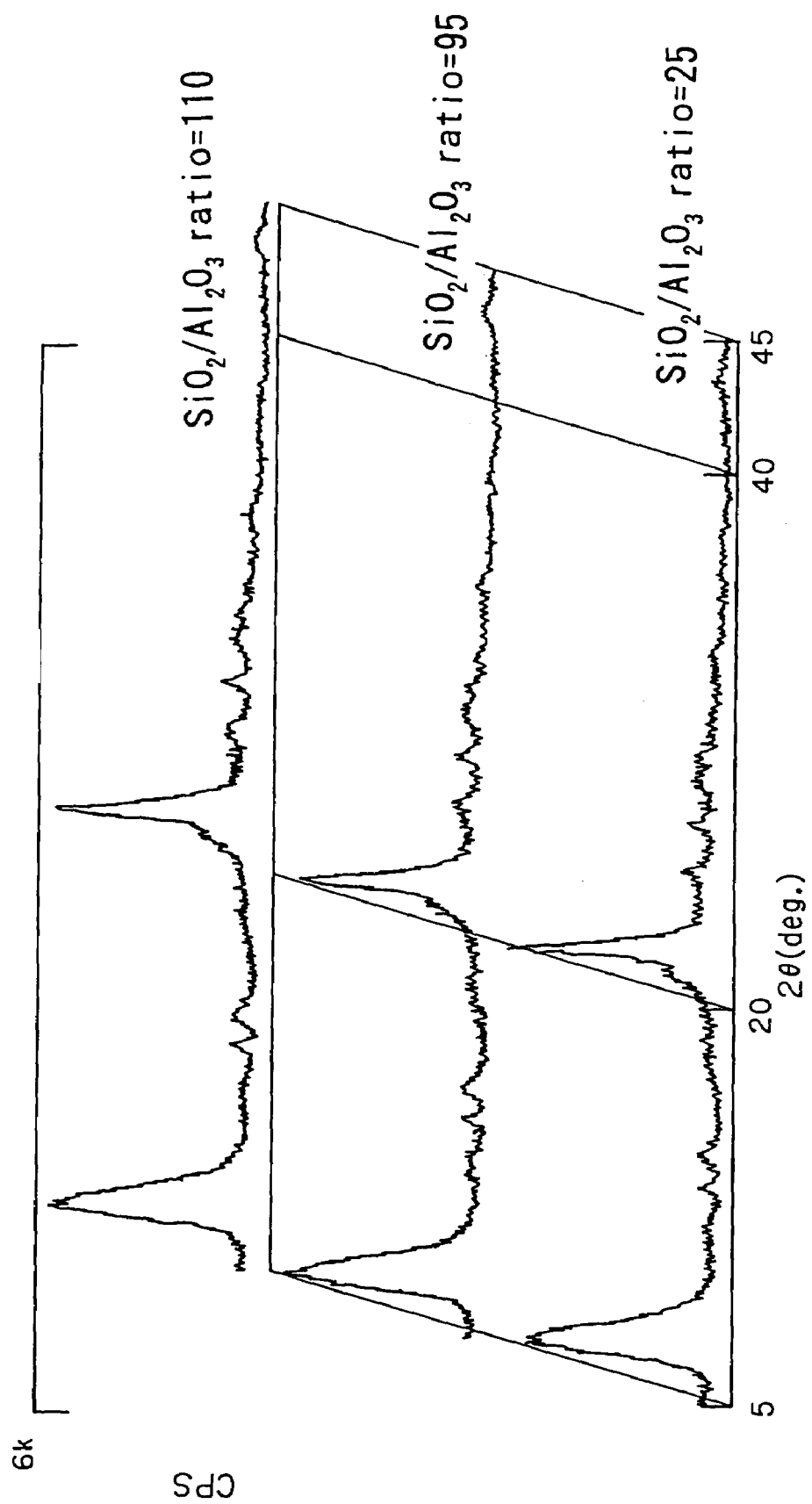
FIG. 1 is a drawing showing the X-ray diffraction patterns of the H-type β-zeolites before durability test, used in adsorbents.

The system for exhaust gas purification according to the present invention has a primary purpose of reducing the hydrocarbons emitted during cold engine start up, for about 150 seconds from cranking. As the regulation for automobile exhaust gas is becoming severer year by year and there are being taken approaches of providing an exhaust gas purification system at a position closer to the engine or employing no fuel cooling, each component constituting the system is required to have higher heat resistance and the adsorbent component must have heat resistance higher than before.

In view of the above situation, the present inventors made a study. As a result, in the present invention, a H-type βtype-zeolite having a $SiO_2/Al_2O_3$ ratio of 100 or more, preferably 200 or more is used as the main adsorbent component contained in the adsorbent of the present system. ZSM-5 and USY have heat resistance as well, as long as they have a $SiO_2/Al_2O_3$ ratio of 100 or more, but are inferior in adsorption capability to the H-type β-zeolite; therefore, an exhaust gas purification system using ZSM-5 or USY is inferior in purification ability to the present exhaust gas purification system.

The H-type β-zeolite has excellent adsorption performance for the following reasons. It has large pores (0.76× 0.64 nm) and medium-size pores (0.55×0.55 nm), and can adsorb even large molecules of m-xylene, etc. as well as medium-size molecules of toluene, etc.; its pores are connected three-dimensionally and the molecules to be adsorbed can diffuse into the pores from various directions; and the pores have large volumes and accordingly have a large adsorption capacity. ZSM-5, although having pores connected three-dimensionally, has pores (0.53×0.56 nm) and is unabl to adsorb hydrocarbons of large molecules. USY, although having windows (0.74 nm), has super cages (1.3 nm) which are very large as compared with the molecules to be adsorbed; therefore, its pores have low affinity with the molecules to be adsorbed and are unable to show sufficient adsorption capability. Further, USY shows even reduced adsorption capability owing to the adverse effect of the moisture contained in exhaust gas.

The H-type β-zeolite has a crystal structure of inferior heat resistance, as compared with ZSM-5 and USY of the same $SiO_2/Al_2O_3$ ratio. The reason is not clarified yet. The reason may be that the H-type β-zeolite has a large pore volume, that is, has a small framework density, or may be that β-zeolite is difficult to synthesize and has a low crystallinity or contains a large number of Si or Al defects. Therefore, in the H-type β-zeolite, the effect of $SiO_2/Al_2O_3$ ratio on heat resistance is more sensitive than in ZSM-5 or USY. When the H-type β-zeolite has a $SiO_2/Al_2O_3$ ratio smaller than 100, the zeolite, when exposed to an exhaust gas of 750° C. or more, is unable to maintain the pore structure and comes to have a greatly reduced specific surface area, which makes such a zeolite unusable in an in-line type exhaust gas purification system.

In the present invention, the $SiO_2/Al_2O_3$ ratio of the H-type β-zeolite was specified to be 100 or more, preferably 200 or more from the above-mentioned reasons. A H-type β-zeolite having a $SiO_2/Al_2O_3$ ratio of 100 or more has excellent adsorption capability and shows good emission control in the FTP test and, even when exposed to an exhaust gas of 750° C. or more, can maintain the pore structure and has excellent heat resistance.

The adsorbent used in the present exhaust gas purification system may contain other zeolite, for example, ZSM-5, mordenite or USY as long as it contains, as the main adsorbent component, a H-type β-zeolite having a $SiO_2/Al_2O_3$ ratio of 100 or more.

The forms of the adsorbent and the catalyst both used in the present exhaust gas purification system are not particularly restricted and may be any of beads, pellets, a honeycomb shape, a ring shape, etc. A preferred form is, from the viewpoints of pressure loss and thermal shock resistance, a honeycomb structure made of cordierite or ferrite type stainless steel, having a catalyst or adsorbent component coated thereon. This honeycomb structure needs to have a large geometrical surface area because the catalytic reaction or adsorption taking place in the catalyst or adsorbent occurs relatively quickly, and it is preferable to use a honeycomb structure having a cell density of 100 cells/in.$^2$ or more.

The shape of the honeycomb structure may be a cylinder, an ellipsoid or the like ordinarily used for supporting of automobile catalyst. One preferable honeycomb structure used in the adsorbent of the present exhaust gas purification system may be such that obtained by removing, from an ordinary honeycomb structure, the central portion extending in the passage direction to make the structure hollow for easier gas passing through the hollow portion. When an adsorbent made using such a honeycomb structure having a central hollow portion is arranged upstream of the catalyst in an exhaust pipe, the exhaust gas passing through the hollow portion of the adsorbent warms up the downstream catalyst and raises the temperature of the catalyst earlier; as a result, the hydrocarbons desorbed from the adsorbent can be removed by the catalyst more efficiently.

Preferably, the catalyst component contained in the catalyst can react at the temperature at which the hydrocarbons, etc. adsorbed by the adsorbent is desorbed therefrom, i.e. at low temperatures of about 200° C. The catalyst preferably contains, as the catalyst component, at least one noble metal selected from Pt, Pd and Rh. The adsorbent as well can contain, as a catalyst component, at least one noble metal selected from Pt, Pd and Rh, in addition to the H-type β-zeolite having a $SiO_2/Al_2O_3$ ratio of 100 or more (such an adsorbent containing a catalyst component is hereinafter referred to as "adsorbent-catalyst").

These noble metals are generally used by being loaded on a heat-resistant oxide (e.g. $Al_2O_3$, $SiO_2$, $TiO_2$ or $ZrO_2$) or a compound oxide thereof. Use of, in particular, $Al_2O_3$ having a specific surface area of 100 m$^2$/g or more is preferable because it enables loading of noble metal(s) on the $Al_2O_3$ in a highly dispersed state and brings about improvements in low-temperature light-off performance and heat resistance. Addition, to the heat-resistant oxide, of 5–30% by weight of an oxide having oxygen storage ability, such as $CeO_2$, $La_2O_3$, $CeO_2$—$ZrO_2$ or the like is very preferable because it brings about improvement in catalytic activity. The total amount of the noble metal(s) loaded on the catalyst or the adsorbent-catalyst is preferably about 20–200 g/ft$^3$. More preferably, only Pd is loaded on the catalyst or the adsorbent-catalyst in view of cost and properties, particularly, heat resistance. Of the amount, the amount of Rh is preferably 2–30 g/ft$^3$.

As a preferable example of the adsorbent-catalyst, there can be cited a double-layered adsorbent-catalyst comprising a honeycomb structure coated with a substance composed mainly of a H-type β-zeolite having a $SiO_2/Al_2O_3$ ratio of 100 or more (the coated substance forms a first coating layer) and subsequently with an $Al_2O_3$—$CeO_2$ compound oxide having a noble metal(s) loaded thereon (the coated $Al_2O_3$—$CeO_2$ compound oxide forms a second coating layer).

In such a double-layered adsorbent-catalyst, the $Al_2O_3$, which is the main component of the second layer, acts as a predryer which selectively adsorbs the $H_2O$ contained in the exhaust gas emitted during cold engine start up, whereby the adsorption capability of the first layer for hydrocarbons, etc. is increased. In addition, as the temperature of exhaust gas rises, heating of the adsorbent-catalyst occurs first with the second layer (the outer layer) containing a catalyst component and, at the time when the zeolite component of the first layer desorbs the adsorbed hydrocarbons, etc., the catalyst component of the second layer exhibits the catalytic activity favorably.

The catalyst component and the adsorbent component (zeolite component) may be loaded on a honeycomb structure in a mixed state. This adsorbent-catalyst as well shows a relatively good effect.

The weight ratio of the zeolite component and the heat-resistant oxides with catalyst components is about 50–85: 15–50. Preferably, the zeolite component is contained in a larger amount. The amounts of the zeolite component and the heat-resistant oxides with catalyst components loaded on the honeycomb structure are preferably 0.05–0.25 g/cc (the zeolite component) and 0.02–0.20 g/cc (the heat-resistant oxides with catalyst components).

The system for exhaust gas purification according to the present invention is constituted by providing at least one adsorbent (adsorbent-catalyst) and at least one catalyst (both described above) in an in-line type exhaust pipe of internal combustion engine. The order of mounting of the adsorbent (adsorbent-catalyst) and the catalyst may be arbitrary, but it is preferable that the adsorbent (adsorbent-catalyst) is provided upstream of the most downstream catalyst ("upstream" or "downstream" is used in connection with the direction of flow of exhaust gas).

In the system for exhaust gas purification according to the present invention, it is preferable that a means capable of introducing secondary air from upstream of the most upstream adsorbent (adsorbent-catalyst) or catalyst is provided. The hydrocarbons, etc. emitted in large amounts during cold engine start up are once adsorbed by the adsorbent and, with the rise of the exhaust gas temperature, are gradually desorbed from the adsorbent; at this time, by introducing secondary air to shift the exhaust gas composition to an oxygen-excessive side, the catalyst can have an increased oxidation activity and exhibit a sufficient purification ability. A preferable means for introducing secondary air is an air pump, for example.

The present invention is hereinafter described in detail by way of Examples. However, the present invention is not restricted to these Examples.

[Production of Adsorbents and Adsorbent-Catalysts and Evaluation of their Structural Durabilities]

(Adsorbent A)

An alumina sol having an alumina solid content of 2.5% by weight and water were added to a H-type β-zeolite ($SiO_2/Al_2O_3$ ratio=110, product of The PQ Corporation). The mixture was subjected to wet grinding for 20 hours by the use of a ball mill to prepare a slurry to be loaded. In the slurry was dipped a cordierite honeycomb of 5.66 in. (diameter) and 100 mm (length) produced by NGK Insulators, Ltd. [square cells, cell density=400 cells/in.$^2$, rib thickness=6 mil (150μ)] to coat the honeycomb in a loaded slurry amount of 0.16 g/cc. Then, the coated honeycomb was dried and fired in air at 550° C. for 1 hour to obtain an adsorbent A.

To examine the thermal durability, the adsorbent A was subjected to a durability test which comprised setting the adsorbent A in the exhaust pipe of an automobile engine having a displacement of 2,000 cc so that the exhaust gas temperature at the inlet of the adsorbent A became 750° C. or 850° C. during fueling and, in that state, operating the engine for 100 hours in "Fuel Cut Mode", in which the fueling is stopped for 10 seconds in every 60 seconds. To examine the zeolite pore structures before and after the durability test, the loaded zeolite was stripped off and its specific surface area was measured before and after the test. The results are shown in Table 1.

(Adsorbents B and C)

A H-type β-zeolite ($SiO_2/Al_2O_3$ ratio=110, product of The PQ Corporation) was subjected a plurality of times to a steam treatment (650° C.×5 hours) and a subsequent treatment of leaching in 1 N aqueous hydrochloric acid solution, to obtain two kinds of H-type β-zeolites having $SiO_2/Al_2O_3$ ratios of 210 and 290, respectively. Each of the zeolite powders was loaded on a honeycomb in the same manner as in the adsorbent A, to obtain adsorbents B and C. These adsorbents were examined for thermal durabilities in the same manner as in the adsorbent A. The results are shown in Table 1.

(Adsorbent D)

An adsorbent D was produced in the same manner as in the adsorbent A except that there was used, as the carrier, a honeycomb having a central hollow portion, obtained by removing, from a cordierite honeycomb of 5.66 in. (diameter) and 100 mm (length) produced by NGK Insulators, Ltd. (square cells, cell density=400 cells/in.$^2$, rib thickness=150μ), its central portion having a diameter of 34 mm and a length of 100 mm extending in the passage direction. The adsorbent D was examined for thermal durability in the same manner as in the adsorbent A. The results are shown in Table 1.

(Adsorbent E)

An adsorbent E was produced in the same manner as in the adsorbent A except that (1) there was used, as the carrier, a honeycomb having a central hollow portion, obtained by removing, from a cordierite honeycomb of 5.66 in. (diameter) and 100 mm (length) produced by NGK Insulators, Ltd. (square cells, cell density=400 cells/in.$^2$, rib thickness=150μ), its central portion having a diameter of 34 mm and a length of 100 mm extending in the passage direction and (2) there was used, as the adsorbent component to be loaded on the carrier, a 8:2 (by weight) mixture of (a) a H-type β-zeolite having a $SiO_2/Al_2O_3$ ratio of 210 produced in the same manner as in the adsorbent B and (b) a H type ZSM-5 having a $SiO_2/Al_2O_3$ ratio of 200 (product of The PQ Corporation). The adsorbent E was examined for thermal durability in the same manner as in the adsorbent A. The results are shown in Table 1.

(Adsorbents F to N)

Each of the powders of H type ZSM-5's ($SiO_2/Al_2O_3$ ratios=50, 150, 200 and 250), H-type β-zeolites ($SiO_2/Al_2O_3$ ratios=25 and 95) and H type USY's ($SiO_2/Al_2O_3$ ratios=60, 80 and 150) was loaded on a honeycomb in the same manner as in the adsorbent A to obtain adsorbents F to N. These adsorbents were examined for thermal durabilities in the same manner as in the adsorbent A. The results are shown in Table 1.

(Adsorbent O)

An adsorbent O was produced in the same manner as in the adsorbent A except that (1) there was used, as the carrier, a honeycomb having a central hollow portion, obtained by removing, from a cordierite honeycomb of 5.66 in. (diameter) and 100 mm (length) produced by NGK Insulators, Ltd. (square cells, cell density 400 cells/in.$^2$, rib thickness=150μ), its central portion having a diameter of 34 mm and a length of 100 mm extending in the passage direction and (2) there was used, as the adsorbent component to be loaded on the carrier, a 7:3 (by weight) mixture of (a) a H-type β-zeolite having a $SiO_2/Al_2O_3$ ratio of 25 (product of the PQ Corporation) and (b) a H type ZSM-5 having a $SiO_2/Al_2O_3$ ratio of 200 (product of The PQ Corporation). The adsorbent O was examined for thermal durability in the same manner as in the adsorbent A. The results are shown in Table 1.

(Adsorbent-Catalysts A and B)

A catalyst component was loaded on the above-produced adsorbent A or B according to the following procedure to prepare adsorbent-catalysts A and B each having a first layer (an inner layer) having hydrocarbons adsorption capability and a second layer (a surface layer) having a three-way catalytic activity.

Cerium acetate and cerium oxide were added to a commercial γ-$Al_2O_3$ having a specific surface area of 200 m$^2$/g, in an amount of 30% by weight in terms of oxide. The mixture was disintegrated, dried and calcinated at 550° C. to obtain a compound oxide γ-$Al_2O_3$.$CeO_2$. The compound oxide was impregnated with Pt, Rh and Pd by the use of each aqueous solution of $H_2PtCl_6$, $Rh(NO_3)_3$ or $(NH_4)_3PdCl_2$, followed by drying and firing at 500° C., to obtain an $Al_2O_3$.$CeO_2$ powder loaded with three kinds of noble metals. To the powder were added small amounts of water and acetic acid to prepare a slurry to be loaded. The adsorbent A or B were dipped in the slurry to load 0.1 g/cc of a catalyst component on the surface of the adsorbent. The resulting material was dried and fired at 500° C. to obtain an adsorbent-catalysts A and B. In each adsorbent-catalyst, the total amount of the noble metals loaded was 80 g/ft³ and the weight ratio of Pt:Pd:Rh was 2:3:1. The adsorbent-catalysts A and B were examined for thermal durabilities in the same manner as in the adsorbent A. The results are shown in Table 1.

(Adsorbent-Catalyst C)

There was used a honeycomb having a central hollow portion, obtained by removing, from a cordierite honeycomb of 5.66 in. (diameter) and 100 mm (length) produced by NGK Insulators, Ltd. (square cells, cell density=400 cells/in.², rib thickness=150μ), its central portion having a diameter of 34 mm and a length of 100 mm extending in the passage direction. The honeycomb was loaded, in the same manner as in the adsorbent A, with a H-type β-zeolite having a $SiO_2/Al_2O_3$ ratio of 290, produced in the same manner as in the adsorbent C, to obtain an adsorbent. The adsorbent was loaded with a catalyst component in the same manner as in the adsorbent-catalysts A and B, to produce an adsorbent-catalyst C. The adsorbent-catalyst C was examined for thermal durability in the same manner as in the adsorbent A. The results are shown in Table 1.

(Adsorbent-Catalysts D and E)

The above-produced adsorbent I or K was loaded with a catalyst component in the same manner as in the adsorbent-catalysts A and B, to produce adsorbent-catalysts D and E. These adsorbent-catalysts were examined for thermal durabilities in the same manner as in the adsorbent A. The results are shown in Table 1.

(Adsorbent-Catalysts F and G)

Adsorbent-catalysts F and G were produced in the same manner as in the adsorbent-catalysts D and E except that there was used, as the carrier, a honeycomb having a central hollow portion, obtained by removing, from a cordierite honeycomb of 5.66 in. (diameter) and 100 mm (length) produced by NGK Insulators, Ltd. (square cells, cell density=400 cells/in.², rib thickness=150μ), its central portion having a diameter of 34 mm and a length of 100 mm extending in the passage direction. The adsorbent-catalysts were examined for thermal durabilities in the same manner as in the adsorbent A. The results are shown in Table 1.

(Adsorbent-Catalyst H)

There was used a honeycomb having a hollow portion, obtained by removing, from a cordierite honeycomb of 4.66 in. (diameter) and 130 mm (length) produced by NGK Insulators, Ltd. (square cells, cell density=300 cells/in.², rib thickness=250μ), its central portion having a diameter of 24 mm and a length of 130 mm extending in the passage direction. The honeycomb was loaded, in the same manner as in the adsorbent A, with a H-type β-zeolite having a $SiO_2/Al_2O_3$ ratio of 210 produced in the same manner as in the adsorbent B, to obtain an adsorbent.

Subsequently, cerium oxide was added to a commercial γ-$Al_2O_3$ having a specific surface area of 200 m²/g, in an amount of 30% by weight in terms of oxide. The mixture was disintegrated, dried and calcinated at 550° C. to obtain a compound oxide γ-$Al_2O_3 \cdot CeO_2$. The compound oxide was impregnated with Pd by the use of an aqueous solution of $(NH_4)_3Pd$—$Cl_2$, followed by drying and firing at 500° C., to obtain an $Al_2O_3 \cdot CeO_2$ powder loaded with Pd. To the powder were added small amount of water and acetic acid to prepare a slurry to be loaded. The aforementioned adsorbent was dipped in the slurry to load 0.08 g/cc of a catalyst component on the surface of the adsorbent. The resulting material was dried and fired at 500° C. to obtain an adsorbent-catalyst H. The total amount of Pd loaded was 140 g/ft³. The adsorbent-catalyst H were examined for thermal durability in the same manner as in the adsorbent A. The results are shown in Table 1.

(Adsorbent-Catalyst I)

An adsorbent-catalyst I was produced in the same manner as in the adsorbent-catalyst H except that there was used, as the carrier, a honeycomb having a central portion, obtained by removing, from a cordierite honeycomb of 4.66 in. (diamenter) and 100 mm (length) produced by NGK Insulators, Ltd. (square cells, cell density=400 cells/in.², rib thickness=150μ), its central portion having a diameter of 34 mm and a length of 100 mm extending in the passage direction.

TABLE 1

| | Adsorbent component* | Catalyst component | Honeycomb shape (presence of central hollow portion)** | Specific surface area (m²/g) | | |
|---|---|---|---|---|---|---|
| | | | | Before durability test | After 750° C. durability test | After 850° C. durability test |
| Adsorbent A | β-Zeolite(110) | | No | 620 | 480 | 350 |
| Adsorbent B | β-Zeolite(210) | | No | 600 | 500 | 480 |
| Adsorbent C | β-Zeolite(290) | | No | 630 | 590 | 540 |
| Adsorbent D | β-Zeolite(110) | | Yes | 610 | 500 | 410 |
| Adsorbent E | β-Zeolite(210) + ZSM-5(200) 8:2 | | Yes | 490 | 440 | 420 |
| Adsorbent-catalyst A | β-Zeolite(110) | Pt, Pd, Rh | No | 410 | 350 | 300 |
| Adsorbent-catalyst B | β-Zeolite(210) | Pt, Pd, Rh | No | 420 | 380 | 330 |
| Adsorbent-catalyst C | β-Zeolite(290) | Pt, Pd, Rh | Yes | 390 | 370 | 350 |
| Adsorbent-catalyst H | β-Zeolite(210) | Pd-only | Yes | 390 | 380 | 340 |
| Adsorbent-catalyst I | β-Zeolite(210) | Pd-only | Yes | 400 | 370 | 350 |
| Adsorbent F | ZSM-5(50) | | No | 350 | 300 | 250 |
| Adsorbent G | ZSM-5(150) | | No | 390 | 350 | 300 |
| Adsorbent H | ZSM-5(200) | | No | 380 | 350 | 330 |
| Adsorbent I | ZSM-5(250) | | No | 370 | 360 | 300 |

TABLE 1-continued

| | Adsorbent component* | Catalyst component | Honeycomb shape (presence of central hollow portion)** | Specific surface area (m²/g) | | |
|---|---|---|---|---|---|---|
| | | | | Before durability test | After 750° C. durability test | After 850° C. durability test |
| Adsorbent J | β-Zeolite(25) | | No | 600 | 120 | 30 |
| Adsorbent K | β-Zeolite(95) | | No | 630 | 180 | 70 |
| Adsorbent L | USY(60) | | No | 600 | 250 | 120 |
| Adsorbent M | USY(80) | | No | 650 | 370 | 300 |
| Adsorbent N | USY(150) | | No | 680 | 500 | 390 |
| Adsorbent O | β-Zeolite(25) + ZSM-5(200) 7:3 | | Yes | 520 | 180 | 100 |
| Adsorbent-catalyst D | ZSM-5(250) | Pt, Pd, Rh | No | 260 | 250 | 250 |
| Adsorbent-catalyst E | β-Zeolite(95) | Pt, Pd, Rh | No | 480 | 150 | 100 |
| Adsorbent-catalyst F | ZSM-5(250) | Pt, Pd, Rh | Yes | 370 | 370 | 360 |
| Adsorbent-catalyst G | β-Zeolite(95) | Pt, Pd, Rh | Yes | 470 | 200 | 130 |

*All adsorbents are H-type zeolites. Figures in parentheses indicate a $SiO_2/Al_2O_3$ ratio of each zeolite.
***"Yes" refers to a honeycomb shape having a central hollow portion extending in the honeycomb passage direction. "No" refers to a honeycomb shape having no hollow portion.

Figure 2:
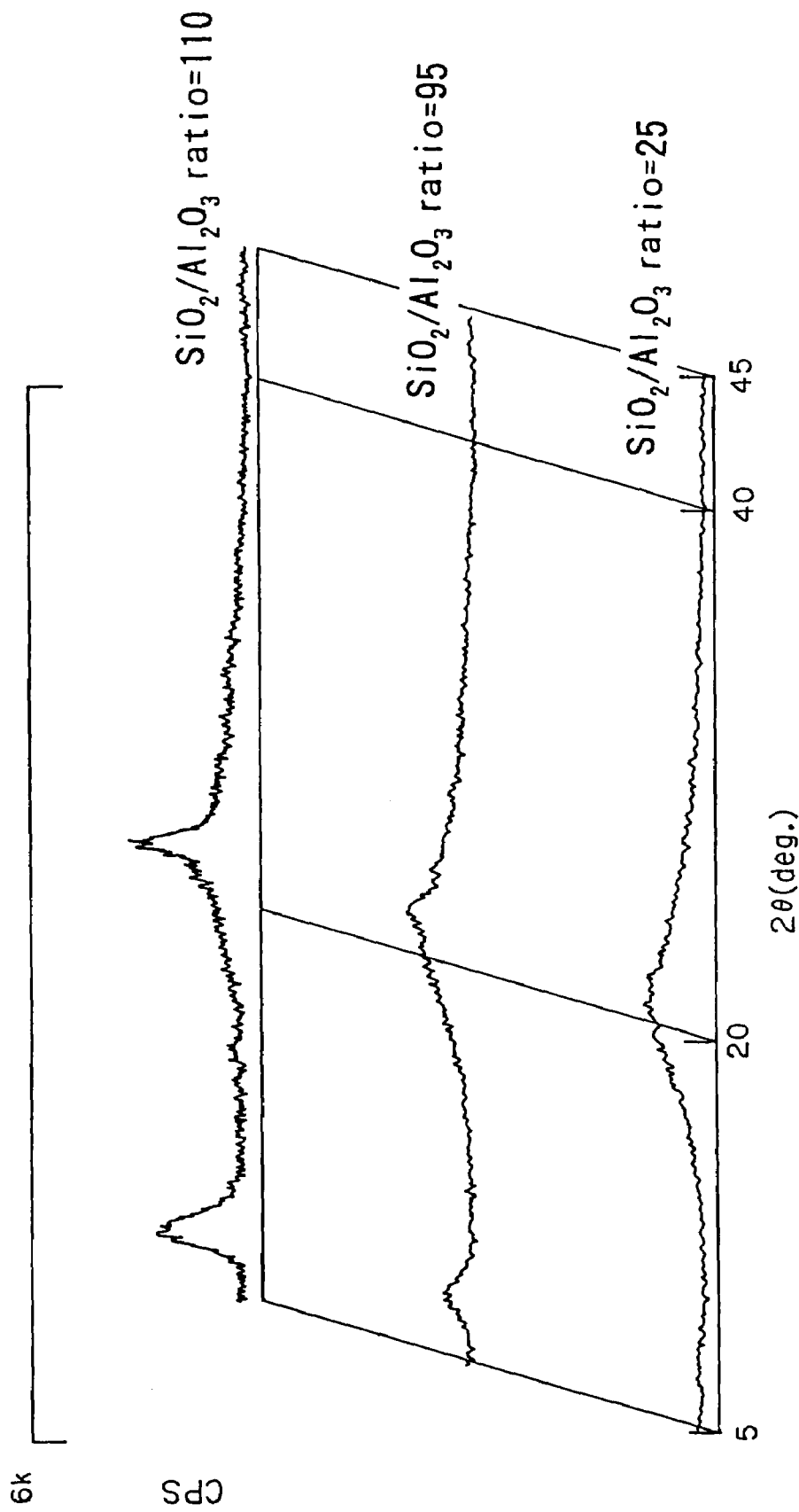
FIG. 2 is a drawing showing the X-ray diffraction patterns of the H-type β-zeolites after durability test, used in adsorbents.

As is clear from Table 1, H-type β-zeolites, as compared with H type ZSM-5's and H type USY's having about the same $SiO_2/Al_2O_3$ ratios, show larger reduction in specific surface area and are inferior in heat resistance; however, H-type β-zeolites have greatly improved heat resistance when their $SiO_2/Al_2O_3$ ratios are 100 or more. Further, to evaluate the heat resistance of crystal structure of β-zeolite, the following three H-type β-zeolites:

β-zeolite ($SiO_2/Al_2O_3$ ratio=110) loaded on adsorbent A
β-zeolite ($SiO_2/Al_2O_3$ ratio=25) loaded on adsorbent J
β-zeolite ($SiO_2/Al_2O_3$ ratio=95) loaded on adsorbent K were measured for X-ray diffraction patterns before and after 750° C. durability test, and the patterns are shown in FIG. 1 (before durability test) and FIG. 2 (after durability test). As is clear from these drawings, the three zeolites show similar peaks before the durability test; however, after the durability test, a zeolite having a larger $SiO_2/Al_2O_3$ ratio shows a higher peak, indicating less destruction of crystal structure.

[Production of Catalysts]

(Catalyst A)

$\gamma$-$Al_2O_3 \cdot CeO_2$ (70:30 by weight) was loaded on a cordierite honeycomb of 3.66 in. (diameter) and 0.4 liter (volume) (product of NGK Insulators, Ltd.) in an amount of 0.23 g/cc. Thereon were loaded Pt, Pd and Rh (6:5:1 by weight) in an amount of 80 g/ft³. The loaded honeycomb was fired at 550° C. to obtain a catalyst A.

(Catalyst B)

A catalyst B was obtained in the same manner as in the catalyst A except that there was used a cordierite honeycomb of 3.66 in. (diameter) and 0.8 liter (volume) (product of NGK Insulators, Ltd.).

(Catalyst C)

A catalyst C was obtained in the same manner as in the catalyst A except that there was used a cordierite honeycomb of 4.66 in. (diameter) and 1.7 liter (volume) (product of NGK Insulators, Ltd.).

(Catalyst D)

$\gamma$-$Al_2O_3 \cdot CeO_2$ (70:30 by weight) was loaded on a cordierite honeycomb of 3.66 in. (diameter) and 1.2 liter (volume) (product of NGK Insulators, Ltd.) in an amount of 0.08 g/cc. Thereon were loaded Pd in an amount of 200 g/ft³ by the use of $(NH_4)_3PdCl_3$ aqueous solution. The loaded honeycomb was fired at 550° C. to obtain a catalyst D.

[Purification Systems and their Evaluations]

Various combinations of the above-produced adsorbents, adsorbent-catalysts and catalysts were set in the exhaust pipe of a Linear-4 cylinder type test car having an engine displacement of 2,000 cc, each in an order shown in Table 2, whereby the exhaust gas purification systems of Examples 1–9 and Comparative Examples 1–7 were assembled. The position of each system was such that the distance between the engine exhaust port and the point of the system closest thereto was 600 mm or 1,000 mm. Incidentally, these adsorbents, adsorbent-catalysts and catalysts had been subjected (before being set) to the same thermal durability test as mentioned in the adsorbent A. Each purification system was subjected to the LA-4 mode (FTP) test of U.S. while secondary air (150 l/min) was introduced, by the use of an air pump, at a position 100 mm upstream of the adsorbent, adsorbent-catalyst or catalyst placed closest to the engine, for 100 seconds from engine cranking. Incidentally, the A/F ratio when no secondary air was introduced, was 12.5–13.5, while the A/F ratio when secondary air was introduced, was 15.0–17.5. The total hydrocarbons amount emitted in the FTP test, obtained with each system is shown in Table 2. Also shown in Table 2 is the hydrocarbons reduction (%) during 150 seconds from engine cranking, which is a yardstick of the joint activity shown by the adsorbent and the catalyst during the first 150 seconds after cold engine start up. This hydrocarbon reduction (%) was calculated from the following formula.

Hydrocarbon reduction (%) during 150 seconds from engine cranking=$[(A-B)/A]\times 100$ A: The total hydrocarbon amount emitted during 150 seconds from engine cranking when neither catalyst nor adsorbent (or adsorbent-catalyst) was mounted.

B: The total hydrocarbon amount emitted during 150 seconds from engine cranking when a catalyst(s) and an adsorbent (or an adsorbent-catalyst) were mounted.

TABLE 2

| | Position of system mounting* (mm) | Order of mounting of system components** | | | | Hydrocarbons reduction from 0 to 150 seconds (%) | Total hydrocarbons emission in FTP (g/mile) |
|---|---|---|---|---|---|---|---|
| Example 1 | 600 | Catalyst A (850° C.) → | Adsorbent-catalyst C (850° C.) → | Catalyst B (850° C.) | | 78 | 0.046 |
| Example 2 | 600 | Adsorbent-catalyst A (850° C.) → | Catalyst C (850° C.) | | | 72 | 0.059 |
| Example 3 | 1000 | Catalyst A (850° C.) → | Adsorbent E (750° C.) → | Catalyst B (750° C.) → | Catalyst C (750° C.) | 65 | 0.055 |
| Example 4 | 1000 | Adsorbent-catalyst B (750° C.) → | Catalyst C (750° C.) | | | 62 | 0.059 |
| Example 5 | 1000 | Catalyst C (850° C.) → | Adsorbent D (850° C.) → | Catalyst A (850° C.) → | Catalyst B (850° C.) | 68 | 0.049 |
| Example 6 | 1000 | Adsorbent B (750° C.) → | Catalyst C (750° C.) | | | 63 | 0.072 |
| Example 7 | 1000 | Catalyst D (850° C.) → | Adsorbent-catalyst G (850° C.) → | Catalyst D (850° C.) | | 80 | 0.042 |
| Example 8 | 800 | Catalyst D (850° C.) → | Adsorbent-catalyst H (850° C.) → | Catalyst D (850° C.) | | 82 | 0.039 |
| Example 9 | 800 | Catalyst D (850° C.) → | Adsorbent-catalyst I (850° C.) → | Catalyst D (850° C.) | | 81 | 0.040 |
| Comparative Example 1 | 600 | Catalyst A (850° C.) → | Adsorbent-catalyst G (850° C.) → | Catalyst B (850° C.) | | 35 | 0.108 |
| Comparative Example 2 | 600 | Catalyst A (850° C.) → | Adsorbent O (850° C.) → | Catalyst B (850° C.) | | 39 | 0.098 |
| Comparative Example 3 | 600 | Catalyst A (850° C.) → | Adsorbent-catalyst F (850° C.) → | Catalyst B (850° C.) | | 46 | 0.090 |
| Comparative Example 4 | 1000 | Catalyst A (850° C.) → | Adsorbent-catalyst G (750° C.) → | Catalyst B (750° C.) → | Catalyst C (750° C.) | 40 | 0.108 |
| Comparative Example 5 | 1000 | Catalyst A (850° C.) → | Adsorbent-catalyst E (750° C.) → | Catalyst B (750° C.) → | Catalyst C (750° C.) | 28 | 0.137 |
| Comparative Example 6 | 1000 | Adsorbent J (750° C.) → | Catalyst C (750° C.) | | | 12 | 0.186 |
| Comparative Example 7 | 1000 | Adsorbent H (750° C.) → | Catalyst C (750° C.) | | | 28 | 0.104 |

*A distance from engine exhaust port to point of system closest to said port.
**Order starting from the most upstream component in the direction of exhaust gas flow. Figures in parentheses indicate an inlet gas temperature during durability test.

As described previously, the system for exhaust gas purification according to the present invention uses, as the adsorbent component contained in the adsorbent, a H-type β-zeolite having a $SiO_2/Al_2O_3$ ratio of 100 or more. Consequently, the adsorbent can maintain good adsorption capability even when exposed to a high-temperature engine exhaust gas of 750° C. or more, and the hydrocarbons desorbed from the adsorbent can be purified on the catalyst sufficiently. Specifically, with the present purification system, the hydrocarbons amount emitted during 150 seconds from engine cranking in the LA-4 mode test of U.S. can be reduced by 60% or more, as compared with when neither catalyst nor adsorbent is used; and the hydrocarbons amount emitted can be reduced not only when the catalyst is in an activated state but also during cold engine start up.

What is claimed is:

1. A system for purification of exhaust gas from an internal combustion engine, consisting essentially of:
   an in-line exhaust pipe;
   an adsorbent zone comprising at least one adsorbent capable of adsorbing harmful substance in an exhaust gas and a catalyst zone comprising at least one catalyst containing a catalyst component capable of reducing said harmful substances, said adsorbent zone and said catalyst zone being positioned in the in-line exhaust pipe of the internal combustion engine with said adsorbent zone being upstream of said catalyst zone with respect to flow of said exhaust gas, in which system harmful substances in an exhaust gas during cold engine start up of the internal combustion engine are adsorbed by the adsorbent and the adsorbed harmful substances are desorbed from the adsorbent with a temperature rise of the adsorbent caused by the heat of the exhaust gas and are burnt on the catalyst, wherein the adsorbent contains, as a main adsorbent component, an H/β-zeolite having an $SiO_2/Al_2O_3$ ratio of from 110 to 290 and further contains at least one noble metal selected from Pt, Pd and Rh as a catalyst component,
   wherein said β-zeolite retains 85% or more of its specific surface area after being exposed to an exhaust gas durability test at 750° C. relative to its specific surface area prior to being exposed to the durability test.

2. A system according to claim 1, wherein the noble metal is Pd.

3. A system according to claim 2, wherein said at least one catalyst contains at least one noble metal selected from Pt, Pd and Rh as the catalyst component.

4. A system according to claim 1, wherein said at least one catalyst contains at least one noble metal selected from Pt, Pd and Rh as the catalyst component.

5. A system according to claim 4, wherein said noble metal contained in said at least one adsorbent is loaded on a heat-resistant oxide.

6. A system according to claim 4, wherein said at least one adsorbent is honeycomb shaped and has a hollow central portion at which honeycomb cells are absent, said hollow central portion extending in the direction of flow of exhaust gas.

7. A system according to claim 1, wherein said noble metal contained in said at least one adsorbent is loaded on a heat-resistant oxide.

8. A system according to claim 7, wherein said at least one adsorbent is honeycomb shaped and has a hollow central portion at which honeycomb cells are absent, said hollow central portion extending in the direction of flow of exhaust gas.

9. A system according to claim 1, wherein said at least one adsorbent is honeycomb shaped and has a hollow central portion at which honeycomb cells are absent, said hollow central portion extending in the direction of flow of exhaust gas so as to allow exhaust gas to flow through said hollow center portion.

10. A system for purification of exhaust gas from an internal combustion engine, consisting essentially of:
    an in-line exhaust pipe;
    an adsorbent zone comprising at least one adsorbent capable of adsorbing harmful substance in an exhaust gas and a catalyst zone comprising at least one catalyst containing a catalyst component capable of reducing said harmful substances, said adsorbent zone and said catalyst zone being positioned in the in-line exhaust pipe of the internal combustion engine with said adsorbent zone being upstream of said catalyst zone with respect to flow of said exhaust gas, in which system harmful substances in an exhaust gas during cold engine start up of the internal combustion engine are adsorbed by the adsorbent and the adsorbed harmful substances are desorbed from the adsorbent with a temperature rise of the adsorbent caused by the heat of the exhaust gas and are burnt on the catalyst, wherein the adsorbent contains, as a main adsorbent component, an H/β-zeolite having an $SiO_2/Al_2O_3$ ratio of from 200 to 290 and further contains at least one noble metal selected from Pt, Pd and Rh as a catalyst component,
    wherein said β-zeolite retains 85% or more of its specific surface area after being exposed to an exhaust gas durability test at 750° C. relative to its specific surface area prior to being exposed to the durability test.

11. A system according to claim 10, wherein the noble metal is Pd.

* * * * *